US 8,214,657 B2

(12) United States Patent
Bartley et al.

(10) Patent No.: US 8,214,657 B2
(45) Date of Patent: Jul. 3, 2012

(54) RESISTANCE SENSING FOR DEFEATING MICROCHIP EXPLOITATION

(75) Inventors: Gerald K Bartley, Rochester, MN (US);
Darryl J Becker, Rochester, MN (US);
Paul E Dahlen, Rochester, MN (US);
Philip R Germann, Oronoco, MN (US);
Andrew B Maki, Rochester, MN (US);
Mark O Maxson, Mantorville, MN (US); John E. Sheets, II, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 12/181,387

(22) Filed: Jul. 29, 2008

(65) Prior Publication Data

US 2010/0026326 A1    Feb. 4, 2010

(51) Int. Cl.
*G06F 11/30*    (2006.01)
(52) U.S. Cl. .......... 713/194; 324/705; 726/20; 380/252
(58) Field of Classification Search .................. 713/194; 324/705; 726/20; 380/252
See application file for complete search history.

(56) References Cited

U.S. PATENT DOCUMENTS

| 4,146,752 | A | | 3/1979 | Konig |
| 4,288,829 | A | | 9/1981 | Tango |
| 5,117,457 | A | * | 5/1992 | Comerford et al. ........... 713/194 |
| 5,177,352 | A | | 1/1993 | Carson et al. |
| 5,389,738 | A | | 2/1995 | Piosenka et al. |
| 5,675,319 | A | * | 10/1997 | Rivenberg et al. ............ 340/550 |
| 5,790,670 | A | | 8/1998 | Bramlett |
| 5,861,652 | A | | 1/1999 | Cole et al. |
| 5,889,306 | A | | 3/1999 | Christensen et al. |
| 6,121,659 | A | | 9/2000 | Christensen et al. |
| 6,264,108 | B1 | | 7/2001 | Baentsch |
| 6,396,400 | B1 | | 5/2002 | Epstein, III et al. |
| 7,005,733 | B2 | | 2/2006 | Kommerling et al. |
| 7,362,248 | B2 | * | 4/2008 | McClure et al. .............. 341/127 |
| 7,555,787 | B2 | | 6/2009 | Clercq |
| 2001/0033012 | A1 | * | 10/2001 | Kommerling et al. ........ 257/679 |
| 2002/0007459 | A1 | | 1/2002 | Cassista et al. |
| 2002/0199111 | A1 | | 12/2002 | Clark et al. |
| 2005/0151777 | A1 | | 7/2005 | Silverbrook |
| 2005/0218401 | A1 | | 10/2005 | Marinet et al. |
| 2005/0274630 | A1 | | 12/2005 | Clark et al. |
| 2005/0275538 | A1 | * | 12/2005 | Kulpa ........................ 340/568.2 |
| 2006/0028340 | A1 | | 2/2006 | Hooghan et al. |
| 2006/0081497 | A1 | * | 4/2006 | Knudsen ....................... 206/701 |

(Continued)

OTHER PUBLICATIONS

Berrie, J; The defensive design of printed-circuit boards; Sep. 1999; IEEE; vol. 36 issue:9; pp. 76-81.*
U.S. Appl. No. 12/181,342, Notice of Allowance dated Jan. 26, 2011, (12 pgs).
Chinchani et al., A Tamper-Resistant Framework for Unambiguous Detection of Attacks in User Space Using Process Monitors, 2003, IEEE, (10 pgs).

(Continued)

*Primary Examiner* — April Shan
(74) *Attorney, Agent, or Firm* — Toler Law Group

(57) ABSTRACT

A method, program product and apparatus include resistance structures positioned proximate security sensitive microchip circuitry. Alteration in the position, makeup or arrangement of the resistance structures may be detected and initiate an action for defending against a reverse engineering or other exploitation effort. The resistance structures may be automatically and selectively designated for monitoring. Some of the resistance structures may have different resistivities. The sensed resistance may be compared to an expected resistance, ratio or other resistance-related value. The structures may be intermingled with false structures, and may be overlapped or otherwise arranged relative to one another to further complicate unwelcome analysis.

20 Claims, 3 Drawing Sheets

U.S. PATENT DOCUMENTS

| | | |
|---|---|---|
| 2006/0157803 A1 | 7/2006 | Chow et al. |
| 2007/0029384 A1 | 2/2007 | Atherton |
| 2008/0000988 A1 | 1/2008 | Farooq et al. |
| 2008/0258754 A1 | 10/2008 | Dillon et al. |
| 2008/0260150 A1 | 10/2008 | De Clercq |
| 2009/0146270 A1 | 6/2009 | Buer et al. |
| 2010/0026313 A1 | 2/2010 | Bartley et al. |
| 2010/0026506 A1 | 2/2010 | Bartley et al. |
| 2010/0031064 A1* | 2/2010 | Walmsley ............... 713/194 |
| 2010/0090714 A1* | 4/2010 | Van Geloven et al. ....... 324/705 |

OTHER PUBLICATIONS

U.S. Appl. No. 12/181,357, Non-Final Office Action dated Jan. 20, 2011, (11 pgs).

U.S. Appl. No. 12/181,357, Final Office Action dated Jul. 1, 2011, (9 pgs).

U.S. Appl. No. 12/181,401, Non-Final Office Action dated Aug. 3, 2011, (12 pgs).

* cited by examiner

RESISTANCE SENSING FOR DEFEATING MICROCHIP EXPLOITATION

RELATED APPLICATIONS

The present application relates to co-pending U.S. patent applications entitled "Capacitance-Based Microchip Exploitation Detection", "Signal Quality Monitoring to Defeat Microchip Exploitation", "False Connection for Defeating Microchip Exploitation", "Interdependent Microchip Functionality for Defeating Exploitation Attempts", "Capacitance Structures for Defeating Microchip Tampering", "Continuity Check Monitoring for Microchip Exploitation Detection", and "Doped Implant Monitoring for Microchip Tamper Detection", all of which are filed concurrently herewith and which are incorporated by reference in their entireties.

FIELD OF THE INVENTION

The present invention relates generally to microchip technologies, and more particularly, to protecting the circuitry and content of microchips.

BACKGROUND OF THE INVENTION

Protecting microchip technology deployed in the field is an enormous concern in both military and commercial sectors. Microchips and related devices are routinely acquired by motivated competitors and governments seeking to reverse engineer or otherwise learn the functionality of the technology. Such information is used to make a technological leap in their own devices, or may be used to exploit a perceived weakness in the examined equipment. Sophisticated government and commercial entities thus possess ample strategic and economic motivation to reverse engineer microchip components.

A microchip, or integrated circuit, is a unit of packaged computer circuitry that is manufactured from a material, such as silicon, at a very small scale. Microchips are made for program logic (logic or microprocessors) and for computer memory (Random Access Memory or other memory microchips). Microchips are also made that include both logic and memory, and for special purposes, such as signal, graphics and other processing applications.

An advanced method of reverse engineering select microchip components uses high energy photons, electrons or ions. Focused ion beam processes excite active portions of a microchip to observe how other portions are affected. When used to reverse engineer, these processes are typically done while the microchip is in a powered-on state in order to observe the functionality of the microchip.

Microchip designers in the aerospace, defense and commercial industries routinely implement software and other logic-related techniques to confuse and thwart attempts to probe the active side of the component. For example, safeguard measures integrated within microchips hinder reverse engineering techniques. Microchip designers capitalize on the powered on status required by a reverse engineering process to incorporate a self-destruct or obstructing mechanism into the microchip. The mechanism is triggered by the detection of tampering. When tampering is detected, the power in the circuit is diverted to microchip annihilation or another predetermined measure.

Microchip designers occasionally impede the reverse engineering processes by additionally plating the back of the bulk silicon with a metal layer. While intact, this layer obstructs both the insertion of ions and electrons, and the observation of photons.

While these safeguards provide some protection, motivated exploiters have developed ingenious ways of analyzing the microchip without triggering the safeguard mechanisms. Despite the precautions, the backside of the microchip remains vulnerable to inspection by photons, focused ion beam, or even simple infrared observation. Sophisticated exploitation techniques overcome conventional obstacles by removing the bulk silicon and metallized back layer. For instance, reverse engineering processes may grind away the metallized portion towards implementing a successful focused ion beam operation. In this manner, microchip information may be exploited in a manner that does not initialize a self-destruct feature.

Consequently what is needed is an improved manner of detecting tampering of a microchip.

SUMMARY OF THE INVENTION

The present invention provides an improved method, apparatus and program product for using resistance structures proximate a microchip to obstruct the undesired analysis of security sensitive circuitry. In one embodiment consistent with the underlying principles of the present invention, an apparatus includes a resistance structure of a plurality of resistance structures proximate security sensitive circuitry of a microchip. Each resistance structure may be associated with a respective resistivity. Circuitry in electronic communication with the resistance structure may be configured to initiate an action for obstructing analysis of the sensitive circuitry in response to receiving a resistance value associated with the resistance structure.

Where desired, the respective resistivities may be integer multiples of one another. The resistance structure may be positioned proximate an exterior surface of the microchip. Electronic communication may include a physical connection, a sequence of physical and/or remote connections, or merely a proximity within which an electrical property may be detected.

According to an aspect of the invention, the resistance structure may be automatically selected from among the plurality of resistance structures. The resistance structure may overlap and contact another resistance structure of the plurality of resistance structures. The resistance structure may comprise a metallic shape.

An embodiment consistent with the invention may include a false resistance structure proximate the security sensitive security and having an appearance similar to at least one of the plurality of resistance structures. A measurement associated with the resistance structure may be unexpected in the absence of the undesired analysis.

Another embodiment that is consistent with the underlying principles of the present invention may include circuitry further configured to measure the resistance value. The action may be initiated where the reference value deviates unacceptably from an expected value. According to an aspect of the invention, the circuitry may compare the resistance value to another resistance value. The other resistance value may comprise an expected resistance value. Alternatively or additionally, the other resistance value may be associated with another resistance structure of the plurality of resistance structures. The other resistance value may be automatically adjustable. The other resistance value may include a ratio.

According to another aspect of the invention, a through-silicon or other via, and/or other connection may connect the resistance structure to the circuitry. An embodiment may further include program code executed by the circuitry and configured to initiate the action for obstructing analysis of the sensitive circuitry in response to receiving the resistance value associated with the resistance structure, as well as a machine/computer readable medium bearing the program code.

According to another aspect of the invention, an apparatus may comprise a resistance structure of a plurality of resistance structures proximate security sensitive circuitry of a microchip, each resistance structure associated with a respective resistivity. Circuitry in communication with the resistance structure may be configured to automatically select the resistance structure from among the plurality for determining if a measured resistance associated with the resistance structure deviates unacceptably from an expected value. In response to an unacceptable deviation, the circuitry may initiate an action for obstructing analysis of the sensitive circuitry.

Another embodiment consistent with the invention may include a method of protecting security sensitive circuitry of a microchip from undesired analysis by, in part, positioning a resistance structure of a plurality of resistance structures proximate the security sensitive circuitry of the microchip. Each resistance structure may be associated with a respective resistivity. Processes may initiate an action for obstructing analysis of the security sensitive circuitry in response to receiving a resistance value associated with the resistance structure that deviates unacceptably from an expected value. The method may further include the automatic selection of the resistance structure from among the plurality of resistance structures.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Figure 1:
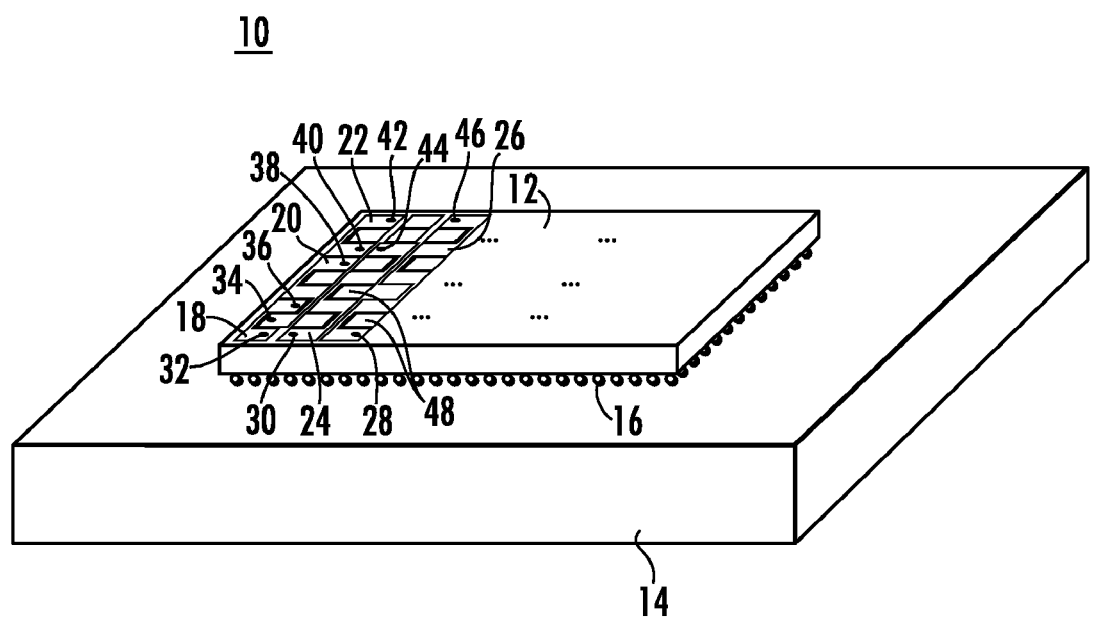
FIG. 1 shows an integrated circuit assembly having resistance structures for use in detecting and obstructing a reverse-engineering attempt in accordance with the underlying principles of the present invention.

Embodiments consistent with the present invention may include resistance structures positioned proximate security sensitive microchip circuitry. Alteration in the position, makeup or arrangement of the resistance structures may be detected and initiate an action for defending against a reverse engineering or other exploitation effort. The resistance structures may be automatically and selectively designated for monitoring. Some of the resistance structures may have different resistivities. The sensed resistance may be compared to an expected resistance, ratio or other resistance-related value. The structures may be intermingled with false structures, and may be overlapped or otherwise arranged relative to one another to further complicate unwelcome analysis.

Embodiments of the invention trigger a defensive action by sensing predefined resistive paths associated with the resistance structures. Exemplary resistance structures may comprise interleaved shapes of differing metals. Embodiments may sense tampering of the microchip if a shape is removed and silicon vias or other connections are reconnected. More particularly, embodiments consistent with the invention compare the sensed path to a baseline. Action may be taken if a significant difference exists between the new measurement and a baseline.

The resistance structures of one embodiment comprise metal shapes of varying types of conductors. The resistance structures may be placed on the backside of the microchip. Where desired, the shapes may be designed with integer multiple resistivities. Overlapping portions of varied conductor types may be accomplished to insure conductivity between the shapes.

The resistance structures may be connected using vias to active sense circuitry on the microchip. A through-silicon via is a type of via that generally comprises a vertical electrical connection passing through a silicon wafer or die for the purpose of creating three-dimensional packages and circuits.

In another or the same embodiment, a known current quantity or impulse is sent from an active driver into a multi-metal grid comprised of the resistance structures. Resistive loss through the resistance structures may be measured by sense circuitry. Measured response characteristics may be compared to known, calibrated results by using a comparator circuit. Deviations of sufficient magnitude may trigger an output signal. The signal may be received by an appropriate shutdown response function on the microchip.

As described above, a copper layer may be applied to the backside of a chip to prevent focused ion beam or thermal imaging processes. Aspects of the invention capitalize on the resistivity difference between copper and other metals to accomplish tampering detection. In one example, tungsten has about three times the resistivity of copper. Like copper, tungsten may be readily processed for semiconductor structures. If a copper camouflaging grid is removed (e.g., ground off to facilitate focused ion beam or thermal imaging efforts), and the vias are re-connected with copper wiring or a copper sheet, the measured resistance will change.

More particularly, the resistivity of copper is 1.7e-8 ohm-m, and the resistivity of tungsten is 5.4e-8 ohm-m. Assuming a one millimeter wide and ten millimeter long current path comprising half copper and half tungsten, the measure resistance is: Rw+Rcu=(5.4e-8*0.005)/30e-9+(1.7e-8*0.005)/30e-9=12 mOhm. Should the path be ground off and reconnected with copper only, the measure resistance will equal: (1.7e-8*0.01)/30e-9=6 mOhm. As such, two-times delta occurs, which is enough to be measured by the detection circuitry described herein.

An embodiment consistent with the principles of the present invention may employ resistance structures on the backside of a microchip. These resistance structures may be designed such that they are integer multiples of a base calibration structure. For instance, one resistance structure may be two times the base calibration resistance structure, while the resistance of another structure may be three times the base calibration resistance. Still another resistance structure may be four and five times, respectively, larger than the base calibration resistance. Vias may be used to connect the resistance structures to circuitry within the microchip that compares the resistance of each structure to the resistance of the base calibration resistance structure.

A plurality of resistance structures may be added to the backside of the microchip. The resistance structures may comprise a single or multiple types of conductors. By using different conductors, e.g., copper and tungsten, reverse engineering is made more difficult. Where so configured, circuitry may determine if the resistance structures are present and have the correct ratios of resistance.

As described herein, a control bus may control which resistance structure is compared to the calibration resistance structure. In one example, a simple resistor divider may be created between the resistance structures. The resistor divider may be fed into one side of a comparator. Fed into the other side of the comparator may be an on-chip variable resistor divider. An array of on-chip resistors may be connected to an on-chip calibration resistor. Control logic may use the bus to set an expected divided voltage into the comparator. The logic may then sweep the value of array of resistors above and below that expected voltage to ensure that the proper resistance ratio is present in the backside resistance structures.

In another embodiment, a layer of tungsten is applied on the back of the die, and then copper areas are patterned to complicate the sense patterns and mask the sense vias. In another or the same embodiment, resistance structures comprising different metals, e.g., copper and tungsten, may be overlapped.

FIG. 1 shows an integrated circuit assembly 10 having resistance structures 18, 20, 22, 24, 26 for use in detecting and obstructing a reverse-engineering attempt. FIG. 1 more particularly shows an integrated circuit assembly 10 having a microchip 12 mounted onto a package 14 using die bumps 16. The resistance structures 18, 20, 22, 24, 26 may be used instead of or in addition to a copper or other metal plate used on the backside of the microchip 12. As may be appreciated, other resistance structures may be placed along the backside surface of the microchip 12. The resistance structures 18, 20, 22, 24, 26 may have different resistivities. In one embodiment, the resistivities of the respective resistance structures 18, 20, 22, 24, 26 may be integer multiples of one another.

The exemplary assembly 10 also includes false resistance structures 48. The false resistance structures 48 may not be directly used to detect an exploitation effort, and may be used to fool or confuse exploitation processes. Connections 28, 30, 32, 34, 36, 38, 40, 42, 44, 46 may connect the resistance structures 18, 20, 22, 24, 26 to circuitry (not shown) used to verify that the resistance structures 18, 20, 22, 24, 26 have not been altered.

The integrated circuit assembly 10 of the embodiment of FIG. 1 comprises a flip chip integrated circuit structure. Flip chip mounting typically uses die bumps 16, e.g., solder, instead of wirebonds. The die bumps 16 are deposited on the microchip pads, which are located on the top side of the wafer during the final wafer processing step. In order to mount the microchip 12 to external circuitry (on a circuit board or another wafer or a microchip), the microchip 12 is flipped over so that the topside of the wafer faces toward the mounting area. The die bumps 16 are used to connect directly to the associated external circuitry. The microchip carrier 14 generally comprises the package in which the microchip 12 is mounted for plugging into (socket mount) or soldering onto (surface mount) a printed circuit board. One skilled in the art will appreciate that any number of other integrated circuit assemblies may be used in conjunction with and benefit from the underlying principles of the present invention. For instance, other embodiments consistent with the invention may include wirebond connections and associated processes.

Figure 2:
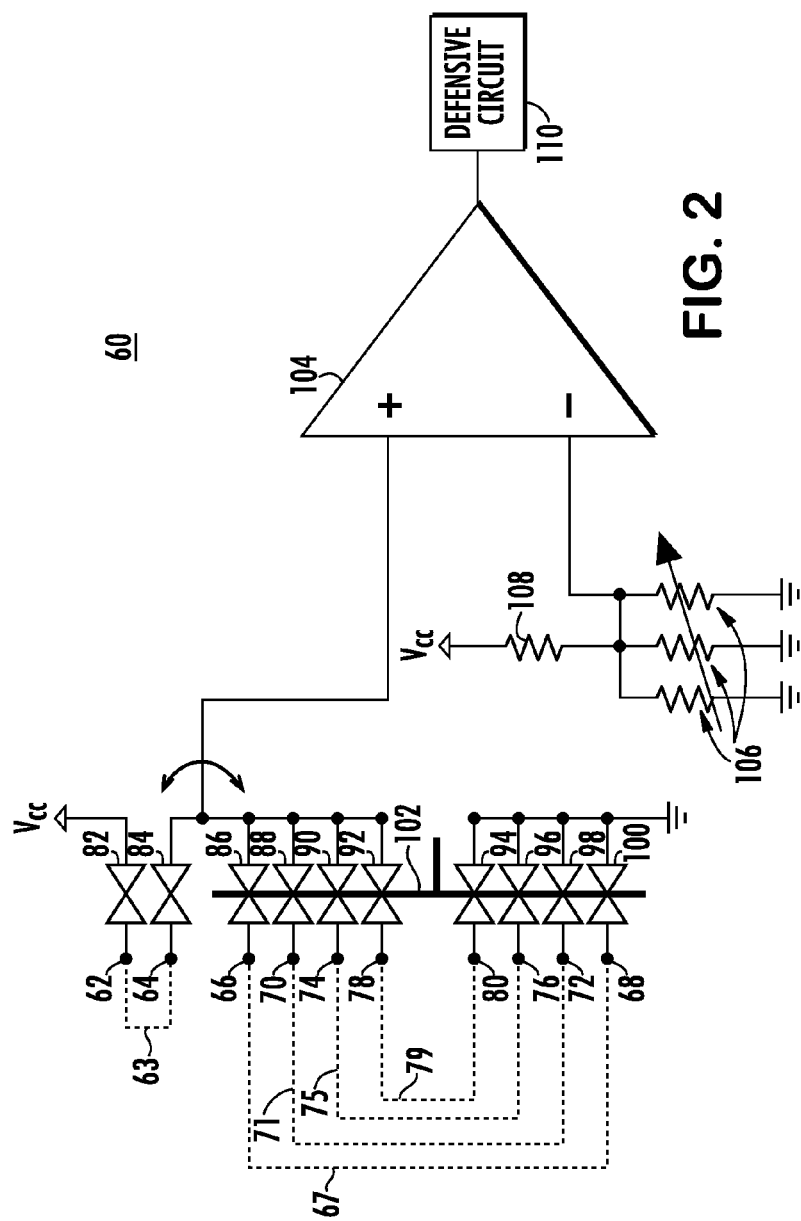
FIG. 2 shows a detection and defensive circuit configured to detect signals affected by resistance structures such as are present in the integrated circuit assembly of FIG. 1.

FIG. 2 shows a detection and defensive circuit 60 configured to detect signals affected by the resistance structures 18, 20, 22, 24, 26 such as are present in the integrated circuit assembly 10 of FIG. 1. Each circuit includes a plurality of inputs 62, 64, 66, 68, 70, 72, 74, 76, 78, 80 that may correspond to connections 28, 30, 32, 34, 36, 38, 40, 42, 44, 46, as shown in FIG. 1. Exemplary connections 28, 30, 32, 34, 36, 38, 40, 42, 44, 46 include through-silicon or other vias, deep-trench connections, or virtually any conductive material.

The inputs 62, 64, 66, 68, 70, 72, 74, 76, 78, 80 may be received at a plurality of respective multiplexers 82, 84, 86, 88, 90, 92, 94, 96, 98, 100. Two of the inputs 62, 64 may comprise part of a voltage divider with selective pairs of other inputs 66, 68, 70, 72, 74, 76, 78, 80. As such, FIG. 2 includes logical connections 63, 67, 71, 75, 79 corresponding to physical connections between respective vias or other connections 62, 64, 66, 68, 70, 72, 74, 76, 78, 80.

A bus 102 may control which resistance structure is compared to the calibration resistance structure 62, 63, 64. In one example, a simple resistor divider may be created between inputs corresponding to the resistance structures 62, 64, 66, 68, 70, 72, 74, 76, 78, 80. The resistor divider may be fed into one side of a comparator 104. Fed into the other input prong of the comparator 104 may be an on-chip variable resistor divider formed by a calibration resistor 108 and an array of resistors. As such, the array of on-chip resistors 106 may be connected to the on-chip calibration resistor 108. Control logic may use the bus 102 to set an expected divided voltage into the comparator 104. The logic may then sweep the value of array of resistors 106 above and below that expected voltage to ensure that the proper resistance ratio is present in the backside resistance structures.

The control bus 102 may be used to automatically select a pair of inputs 66, 68, 70, 72, 74, 76, 78, 80 used to form the other prong of the voltage divider along with inputs 62, 64. The selection process may be manual or automated, and may be accomplished initially and/or on a continual basis. That is, the control bus 102 may be used to determine which resistant structure 20, 22, 24, 26 should be compared to the resistance calibration structure 18.

The resultant voltage may be input to a positive prong of the comparator 104. The minus prong of the comparator 104 may receive voltage from the on-microchip variable resistor divider comprising the calibration resistor 108 and the array of on-microchip resistors 106. The array of resistors 106 may be variable and tunable. The array 106 and associated resistance values may be swept above and below an expected voltage to ensure that the proper resistance ratio is present at the backside of the resistant structures 62, 64, 66, 68, 70, 72, 74, 76, 78, 80 associated with inputs 62, 64, 66, 68, 70, 72, 74, 76, 78, 80.

Figure 3:
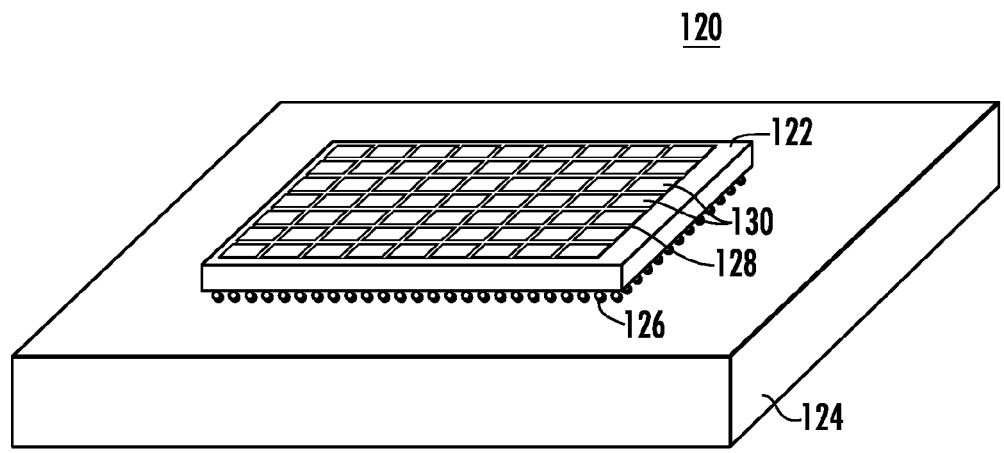
FIG. 3 shows an integrated circuit assembly having a first resistance structure positioned underneath a pattern of other resistance material in accordance with the underlying principles of the present invention.

FIG. 3 shows an integrated circuit assembly 120 having first resistance layer 128 patterned over with other resistance material 130. The patterned, resistance material 130 may mask vias used to sense the associated resistances. The first resistive layer 128 may comprise tungsten. The patterned resistance material 128 may include copper. The resistance structures 128, 130 may be positioned proximate a microchip 122, which mounts onto package carrier 124 using die bumps 126.

Figure 4:
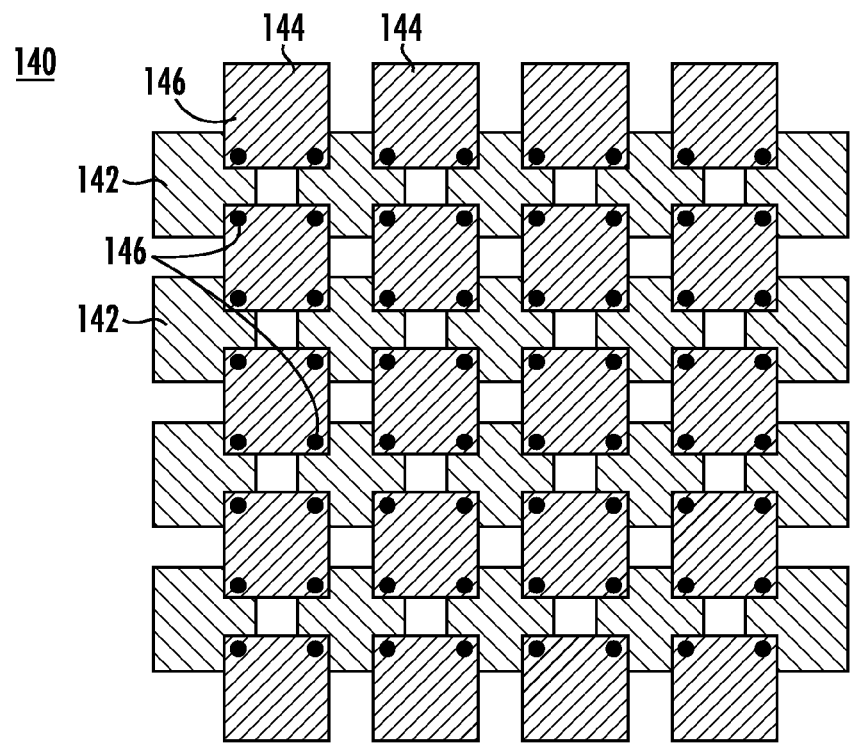
FIG. 4 shows a top view of resistance structures overlapped and configured for use in detecting a microchip exploitation attempt in accordance with the underlying principles of the present invention.

FIG. 4 shows a top view 140 of resistance structures 142, 144 overlapped and configured for use in detecting a microchip exploitation attempt. The resistance structures 142, 144 may have different resistivities. Vias 146 or other connections may be used to communicate the respective resistivities to circuitry 60 used to verify expected ratios. Patterns between the metals comprising the resistance structures 142, 144 may thus further contribute to the complexity of a potential reverse engineering attempt.

Figure 5:
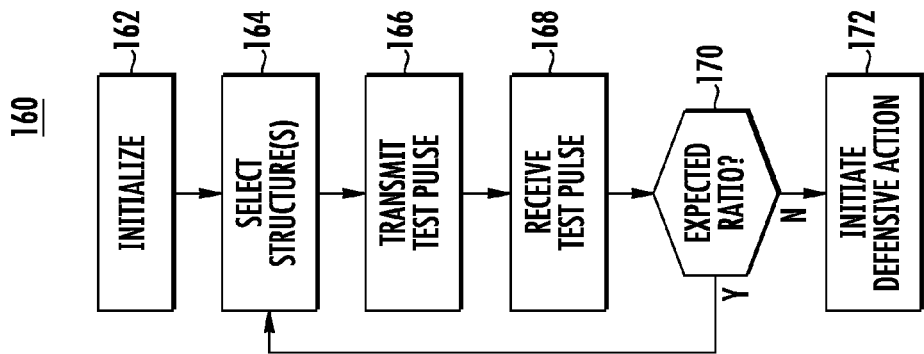
FIG. 5 shows a flowchart 160 having steps executable by the integrated circuit assembly 10 of FIG. 1 for detecting and defending against a microchip exploitation attempt in accordance with the underlying principles of the present invention.

FIG. 5 shows a flowchart 160 having steps executable by the integrated circuit assembly 10 of FIG. 1 for detecting and defending against a microchip exploitation attempt. Turning more particularly to the steps of the flowchart 160, processes associated with the detection of such a tampering effort may initialize at block 162. Initialization processes may prompt at block 164 the selection of one or more inputs 62, 64, 66, 68, 70, 72, 74, 76, 78, 80 corresponding to resistance structures 28, 30, 32, 34, 36, 38, 40, 42, 44, 46 for use in verifying expected resistance levels. Selection of the structures 28, 30, 32, 34, 36, 38, 40, 42, 44, 46 and associated inputs 62, 64, 66, 68, 70, 72, 74, 76, 78, 80 may be accomplished automatically. Resistances associated with the selected structure(s) 28, 30, 32, 34, 36, 38, 40, 42, 44, 46 may be communicated to circuitry 60 and used to verify the integrity of the assembly 10.

More specifically, the circuitry 60 may receive an input indicating which resistance ratios are to be expected based upon the selected structures 18, 20, 22, 24, 26. Defensive circuitry 110 may determine if the output from the comparator 104 does not match an expected output signal or series of signals. In response to a non-match, the defensive circuitry 110 may initiate a defensive action. Examples of defensive actions may include shutdown, spoofing and self-destruct operations.

An input signal may be transmitted at block 166 to the selected resistance structures as a test pulse. The test pulse and associated voltage resulting and imparted by the selected resistance structures may be received at block 168.

Circuitry 60 may compare the received signal to determine at block 170 if an expected ratio was achieved. If so, then the assembly 10 may continue to monitor for potential alteration at block 164. Where the expected ratio was alternatively not present at block 170, then the circuit 60 may initiate at block 172 a defensive action.

While the invention has and hereinafter will be described in the context of integrated circuit assemblies, those skilled in the art will appreciate that the various embodiments of the invention are capable of being distributed as a program product in a variety of forms, and that the invention applies equally regardless of the particular type of machine/computer readable, signal bearing media used to actually carry out the distribution. For instance, a separate processor incorporated within or otherwise in communication with an integrated circuit assembly may access memory to execute program code functions to identify tampering in a software manner that is consistent with the underlying principles of the present invention. Examples of signal bearing, machine/computer readable media include, but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In general, the routines executed to implement the embodiments of the invention, whether implemented in hardware, as part of an integrated circuit assembly, or as a specific application, component, program, engine, process, programmatic tool, object, module or sequence of instructions, or even a subset thereof, may be referred to herein as an "algorithm," "function," "program code," or simply "program." Program code typically comprises one or more instructions that are resident at various times in various memory and storage devices in a computing system. When read and executed by one or more processors, the program code performs the steps necessary to execute steps or elements embodying the various aspects of the invention. One of skill in the art should appreciate that embodiments consistent with the principles of the present invention may nonetheless use program code resident at only one, or any number of locations.

Those skilled in the art will further recognize that the exemplary environments illustrated in FIGS. 1-5 are not intended to limit the present invention. For instance, while flip chip mounting processes are used in many of the embodiments above for exemplary purposes, embodiments of the invention may have equal applicability to microchip assemblies associated with virtually any other mounting technique. Indeed, those skilled in the art will recognize that other alternative hardware and/or software environments may be used without departing from the scope of the invention.

Moreover, while the present invention has been illustrated by a description of various embodiments and while these embodiments have been described in considerable detail, it is not the intention of the Applicants to restrict, or in any way limit the scope of the appended claims to such detail. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. An apparatus comprising:
a plurality of resistance structures attached to a microchip proximate to security sensitive circuitry of the microchip, wherein each of the plurality of resistance structures is associated with a respective resistivity; and
circuitry in electronic communication with each of the plurality of resistance structures, wherein the circuitry is configured to:
measuring a resistance value associated with the respective resistivity of a particular resistance structure of the plurality of resistance structures;
determine whether the measured resistance value deviates from an expected resistance value of the particular resistance structure; and
initiate an action to obstruct analysis of the security sensitive circuitry in response to determining that the measured resistance value deviates from the expected resistance value of the particular resistance structure.

2. The apparatus of claim 1, wherein the respective resistivities are integer multiples of a calibration resistivity.

3. The apparatus of claim 1, wherein each of the plurality of resistance structures is attached to an exterior surface of the microchip.

4. The apparatus of claim 1, wherein the circuitry is further configured to automatically select the particular resistance structure from among the plurality of resistance structures.

5. The apparatus of claim 1, wherein the particular resistance structure overlaps and contacts another resistance structure of the plurality of resistance structures.

6. The apparatus of claim 1 further comprising a false resistance structure attached to a surface of the microchip proximate to the security sensitive circuitry, the false resistance structure having a same appearance to at least one of the plurality of resistance structures, wherein the circuitry is further configured to initiate the action to obstruct analysis of the security sensitive circuitry in response to detecting a resistivity measurement associated with the false resistance structure.

7. The apparatus of claim 1, wherein the particular resistance structure has a planar shape.

8. The apparatus of claim 1, wherein the circuitry determines that the measured resistance value deviates from the expected resistance value based on a comparison of the measured resistance value to a plurality of calibration resistance values.

9. The apparatus of claim 1, wherein the circuitry determines that the measured resistance value deviates from the expected resistance value based on a comparison of the measured resistance value to a resistivity of a calibration resistance structure.

10. The apparatus of claim 1, wherein the circuitry determines that the measured resistance value deviates from the expected resistance value based on a comparison of the measured resistance value to another resistance value.

11. The apparatus of claim 10, wherein the other resistance value is automatically adjustable.

12. The apparatus of claim 10, wherein the comparison produces a resistance ratio.

13. The apparatus of claim 1, wherein the plurality of resistance structures are coupled to the circuitry via an electronic connection.

14. The apparatus of claim 13, wherein the electronic connection comprises a through-silicon via.

15. The apparatus of claim 1, further comprising:
program code executed by the circuitry and configured to initiate the action to obstruct analysis of the security sensitive circuitry in response to determining that the measured resistance value deviates from the expected resistance value of the particular resistance structure; and
a non-transitory computer readable medium bearing the program code.

16. An apparatus comprising:
a first resistance structure of a plurality of resistance structures proximate to security sensitive circuitry of a microchip, wherein each resistance structure is associated with a respective resistivity; and
circuitry in communication with the plurality of resistance structures and configured to:
automatically select the first resistance structure from among the plurality of resistance structures;
measure a resistance value of the first resistance structure;
determine whether the measured resistance value of the first resistance structure deviates from an expected resistance value of the first resistance structure; and
in response to determining that the measured resistance value deviates from the expected resistance value, initiate an action to obstruct analysis of the security sensitive circuitry.

17. A method comprising:
measuring, by a circuit, a resistance value of a particular resistance structure of a plurality of resistance structures attached to a microchip proximate to security sensitive circuitry of the microchip, wherein each of the plurality of resistance structures is associated with a respective resistivity;
determining whether the measured resistance value deviates from an expected resistance value of the particular resistance structure; and
in response to determining that the measured resistance value deviates from the expected resistance value of the particular resistance structure, initiating an action to obstruct analysis of the security sensitive circuitry.

18. The method of claim 17, further comprising automatically selecting the particular resistance structure from among the plurality of resistance structures, wherein the expected resistance value is determined based on the selection of the particular resistance structure.

19. The apparatus of claim 4, wherein the expected resistance value of the particular resistance structure is determined based on the selection of the particular resistance structure.

20. The apparatus of claim 16, wherein each of the plurality of resistance structures has a planar shape, and wherein at least one resistance structure of the plurality of resistance structures overlaps another resistance structure of the plurality of resistance structures.

* * * * *